United States Patent
Thibault (10) Patent No.: US 6,328,890 B1
(45) Date of Patent: Dec. 11, 2001

(54) SEPTIC WASTE TREATMENT SYSTEM

(75) Inventor: Ronald M. Thibault, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 0 days.

(21) Appl. No.: 09/628,124

(22) Filed: Jul. 28, 2000

Related U.S. Application Data (60) Provisional application No. 60/147,940, filed on Aug. 5, 1999.

(51) Int. Cl.$^7$ .................................................. B01D 17/00
(52) U.S. Cl. ..................... 210/532.2; 210/170; 405/36; 405/52; 220/501
(58) Field of Search .................. 405/36, 47, 52, 405/53; 210/170, 322, 532.2, 747; 220/4.12, 501, 523; D23/200, 202, 203

(56) References Cited

U.S. PATENT DOCUMENTS

| | | | |
|---|---|---|---|
| D. 207,293 | * 3/1967 | Ferm | D23/203 |
| D. 226,192 | * 1/1973 | Boyd | D23/203 |
| D. 239,506 | * 4/1976 | Myers | D23/202 |
| 1,715,466 | 6/1929 | Miller . | |
| 3,426,903 | 2/1969 | Olecko . | |
| 3,448,885 | 6/1969 | Parks . | |
| 3,875,066 | 4/1975 | Lind . | |
| 3,907,672 | * 9/1975 | Milne | 210/170 X |
| 3,914,164 | * 10/1975 | Clark | 210/602 |
| 3,923,656 | * 12/1975 | Krebs et al. | 210/170 X |
| 4,070,292 | * 1/1978 | Adams | 210/220 X |
| 4,325,823 | * 4/1982 | Graham | 210/170 X |
| 4,824,287 | 4/1989 | Tracy . | |
| 4,961,670 | 10/1990 | McKenzie et al. . | |
| 4,997,562 | 3/1991 | Warner . | |
| 5,221,470 | * 6/1993 | McKinney | 210/151 |
| 5,266,239 | * 11/1993 | Drewery | 261/64.3 |
| 5,435,914 | * 7/1995 | Bernhardt | 210/322 X |

(List continued on next page.)

FOREIGN PATENT DOCUMENTS

| | | | |
|---|---|---|---|
| 568956 | * 11/1993 | (EP) | 220/523 |
| 8807486 | * 10/1988 | (WO) . | |

OTHER PUBLICATIONS

System Overview and Data Sheets for EnviroServer™, Manufactured by MicroSepTec Inc., Laguna Hills, California, 1999.

*Primary Examiner*—David Bagnell
*Assistant Examiner*—Jong-Suk Lee
(74) *Attorney, Agent, or Firm*—Jeffrey L. Thompson; Thompson & Thompson, P.A (57) ABSTRACT

A septic tank structure having first and second lower tank members and a cover member supported on and forming a seal with respective upper ends of the tank members. The tank members each have a closed lower end, an open upper end, and side walls extending between the lower and upper ends to form a receptacle for receiving waste materials. The tank members have respective flat sides that extend in a substantially vertical plane and are placed together when the tank structure is assembled. The upper ends of the assembled tank members define an outer periphery having an oval shape. The cover member has a lower periphery, a manhole opening, and a steeply sloped wall portion extending between the lower periphery and the manhole opening. The lower periphery of the cover member has an oval shape that corresponds to the oval shape of the upper ends of the assembled tank members. A channel-shaped configuration on the lower periphery of the cover member enhances the seal between the cover member and the tank members. The side walls of the lower tank members are tapered outwardly from a lower end to an upper end to facilitate nesting of the tank members during transport and storage. A plurality of flat areas with raised thicknesses are provided on the side walls of the tank members to facilitate connecting a plurality of tank structures together in many different desired configurations. The lower tank members and cover member are preferably made of a polydicyclopentadiene thermoset material.

20 Claims, 6 Drawing Sheets

U.S. PATENT DOCUMENTS

| | | |
|---|---|---|
| 5,544,460 | 8/1996 | Fife . |
| 5,575,908 | 11/1996 | Mondragon, Jr. . |
| 5,645,732 * | 7/1997 | Daniels .............................. 210/747 |
| 5,746,912 | 5/1998 | Monteith . |
| 5,759,393 * | 6/1998 | Nurse, Jr. .............................. 210/232 |
| 5,802,693 * | 9/1998 | Lee ........................................ 29/416 |
| 6,180,004 * | 1/2001 | Drewery ............................ 210/221.2 |
| 6,280,614 * | 8/2001 | Berg et al. ............................ 210/170 |

* cited by examiner

SEPTIC WASTE TREATMENT SYSTEM

RELATED APPLICATIONS

This application claims the benefit under 35 USC 119(e) of U.S. Provisional Application No. 60/147,940 filed on Aug. 5, 1999.

BACKGROUND OF THE INVENTION

1. Field of the Invention

The present invention relates generally to the treatment of septic waste using tanks that contain liquid and other sewage materials in an underground buried location. In particular, the present invention relates to multiple compartment septic tank systems for processing septic waste in a multi-step process to provide a relatively clean effluent.

2. Description of the Related Art

Septic tanks for processing sewage materials have been known for many years and are generally manufactured from concrete, fiberglass reinforced resin materials, and rotationally molded plastics. Examples of concrete tanks are shown in U.S. Pat. No. 1,715,466 (Miller) and U.S. Pat. No. 5,544,460 (Fife). An example of a fiberglass reinforced septic tank is shown in U.S. Pat. No. 3,426,903 (Olecko). Molded tanks have become popular in recent years due primarily to their weight, cost and convenience. An example of a molded septic tank is shown in U.S. Pat. No. 4,961,670 (McKenzie et al.).

A conventional multi-step waste treatment system has been developed by MicroSepTec, Inc. of Laguna Hills, Calif. This conventional septic waste treatment system processes waste in a multi-step process resulting in a relatively clean effluent that is acceptable for irrigation or discharge into streams. This system uses modified standard septic tanks to hold the waste during processing. The physical installation of this system is much like the installation of a simple septic tank. However, this conventional system suffers from several disadvantages. For example, the tank quality is variable and frequently unsatisfactory, the tanks are large and awkward, and the tanks are not optimally designed to resist overburden and corrosion.

Fiberglass reinforced polyester (FRP) tanks are currently preferred in the industry because the installation and service of the special baffles required by the systems are simpler and more reliable than the alternative, which is roto-molded polyethylene (PE) septic tanks. Adding baffles or changing manways in PE tanks requires plastic welding methods, which are not reliable nor easily accomplished. FRP tanks, however, are largely made by handwork using open-molding methods. These methods are dirty and subject to variances in workmanship by individual craftsmen, which leads to an undesirable variance in quality.

The conventional septic tanks with all modifications are very large and heavy. They must be completely assembled in a factory under close supervision and then transported by truck to the installation site. Freight is very costly and limits the trade area that conventional tanks can be shipped from the point of manufacture. Further, when the tanks arrive at the site, an overhead crane is required to unload and place the tanks. This further increases the cost and creates scheduling problems, particularly where cranes are not readily available. Lastly, unloading and placing the tanks is a problem because FRP is prone to impact damage, which must be repaired at the site before installation can continue. Elimination of transportation, installation, and repair cost is important to improve the market acceptance of new waste treatment systems.

The current designs used by MicroSepTec are typical of plastic septic tank designs that evolved from reinforced concrete (RC) septic tank designs. With RC designs, the low material cost and high strength of RC permits tanks with large width and length and small height. This small height keeps the depth of the hole that must be dug at a minimum while still allowing the tank to receive wastewater by gravity flow. The RC strength easily supports the overburden. With FRP and PE tanks, the height must be increased and the width reduced, while the length can be increased, requiring a deeper and more costly hole. Generally plastic tank designs have included a rectangular base and a steeply arched top to minimize, distribute, and help carry the overburden load. Ribs are often used to strengthen such tanks. Some tanks, like those currently used by MicroSepTec, are simple cylinders with sufficient ribbing to support whatever load is not distributed to the sidewalls, which are supported by the side thrust of the supporting soil. All of these designs utilize extra materials to carry the overburden loads. The ability to reliably manage the overburden loads and avoid failures or leaks is important because such failures can damage the reputation of the manufacturer, violate sanitary ordinances, and result in costly compensation to customers.

The MicroSepTec system is expensive and expected by the customer to operate trouble-free for many years. Both FRP and PE tanks, however, have a limited life expectancy owing to the corrosive effect of some waste streams. The Hitachi Chemical Co. in Japan has recognized this problem and has developed septic tanks made of thermoset materials having a high corrosion resistance. However, early efforts with the existing thermoset materials for septic tanks resulted in difficult technical problems with molding the tanks into existing tank designs.

A new family of thermoset materials, referred to as RUTENE™ polymers, have been developed recently based on polydicyclopentadiene (PDCPD) chemistry. These new polymers solve many of the problems with using thermoset materials for molding septic tanks, and have outstanding corrosion resistance and excellent impact resilience. Osborne Industries, Inc., the assignee of this application, is one of only a few licensees worldwide for these polymers, which have properties similar to thermoplastic polyolefins. RUTENE™ is a proprietary name of Osborne Industries, Inc. Existing septic tank designs are not compatible with the preferred molding methods for the RUTENE™ polymers.

The strong demand for wastewater treatment facilities of the type pioneered by MicroSepTec has created competitors with nearly equivalent systems. Thus, an improved waste treatment system that can be differentiated from the competition using better technology, such as tanks made with RUTENE™ polymers using preferred molding methods, will provide a competitive advantage in this industry.

SUMMARY OF THE INVENTION

It is an object of the present invention to provide an improved septic waste treatment system that solves the problems with the conventional waste treatment systems described above.

More specifically, the principal objects of the present invention are to provide a waste treatment system that: uses a plurality of molded tanks to form the compartments of the septic tank system; has a versatile design which can be configured in many different ways; requires only a few basic parts to minimize inventory requirements; can be shipped as parts to the installation site in a nested arrangement; has individual parts that are low in weight for easy handling and assembly; has a leak free design; minimizes the weight and stress of overburden and distributes it with a generally conical top; resists side pressure during backfilling operations; provides manways naturally and inexpensively without reducing the strength of the system; can be made using state-of-the-art polydicyclopentadiene thermoset polymer materials; and is economical to manufacture, efficient in use, capable of a long operating life, and particularly well adapted for the proposed use.

In order to realize the objects and advantages set forth above, the Applicant has developed an improved septic tank structure having first and second lower tank members and a cover member adapted to be supported on and form a seal with respective upper ends of the lower tank members. The lower tank members each have a closed lower end, an open upper end, and side walls extending between the lower and upper ends to form a receptacle for receiving waste materials. The upper ends of each of the lower tank members define one-half of an oval shape such that when the first and second tank members are placed side-by-side, the upper ends of both tanks together define a complete oval shape. The tank members have respective flat sides that extend in a substantially vertical plane and are placed together when the tank structure is assembled.

The cover member has a lower periphery, a manhole opening, and a steeply sloped wall portion extending between the lower periphery and the manhole opening. The lower periphery of the cover member has an oval shape that corresponds to the oval shape defined by the upper ends of the assembled tank members. A channel-shaped configuration on the lower periphery of the cover member enhances the seal between the cover member and the tank members.

The side walls of the lower tank members are tapered outwardly from a lower end to an upper end to facilitate nesting of the tank members during transport and storage. A plurality of flat areas with raised thicknesses are provided on the side walls of the tank members to facilitate connecting a plurality of tank structures together in many different desired configurations. The lower tank members and cover member are preferably made of a polydicyclopentadiene thermoset material.

According to a broad aspect of the present invention, a septic tank structure is provided comprising: first and second lower tank members, each tank member having a closed lower end, an open upper end, and side walls extending between the lower and upper ends to form a receptacle for receiving waste materials; and a cover member having a lower periphery, a manhole opening, and a sloped wall that extends from the lower periphery upwardly and radially inwardly to the manhole opening; the first and second lower tank members being arranged with respective first portions of their the side walls abutting each other, the cover member being positioned over the first and second lower tank members with the lower periphery of the cover member supported on and forming a seal with the respective upper ends of the first and second lower tank members.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

An improved septic tank structure 10 and waste treatment system according to the present invention will now be described in detail with reference to FIGS. 1 to 7 of the accompanying drawings.

The septic tank structure 10 according to the present invention has first and second lower tank members 11, 12 and a cover member 13 adapted to be supported on and form a seal with respective upper ends of the lower tank members 11, 12. The lower tank members 11, 12 each have a closed lower end 14, an open upper end 15, and side walls 16 extending between the lower and upper ends 14, 15 to form a receptacle for receiving waste materials. The upper ends 15 of each of the lower tank members 11, 12 define one-half of an oval shape in plan view such that when the first and second tank members 11, 12 are assembled together side-by-side, the upper ends 15 of both tank members 11, 12 together define an outer periphery 17 having a complete oval shape in plan view.

The side walls 16 of each tank member 11, 12 include a first flat portion 18 that extends in a substantially vertical plane. The first flat portions 18 of both tank members 11, 12 are placed together in abutting relation when the tank structure 10 is assembled. The first flat portions 18 provide a partition between the receptacle formed by the first lower tank member 11 and the receptacle formed by the second lower tank member 12. The first and second lower tank members 11, 12 are secured together by interconnecting conduits, such as conventional bulkhead connectors 19, 20, extending through openings in the respective first flat portions 18. The bulkhead connectors 19, 20 can be provided with fluid passages for allowing fluid to pass between the first and second lower tank members 11, 12. Alternatively, the bulkhead connectors 19, 20 can be of a construction that does not allow fluid to pass through. The particular location and configuration of the bulkhead connectors 19, 20 can be changed to suit a particular system design.

The side walls 16 of the lower tank members 11, 12 further comprise second and third flat wall portions 21, 22 that extend from each side of the first flat wall portion 18, and a fourth curved wall portion 23 that extends between the second and third flat wall portions 21, 22. The fourth curved wall portion 23 is generally semi-cylindrical with its longitudinal axis perpendicular to the earth surface and has a slightly smaller diameter at its lower end as compared to its upper end. The lower end 14 of each lower tank member 11, 12 defines an outer periphery having a one-half oval shape, which is smaller than the one-half oval shape defined by the upper end 15 of each lower tank member 11, 12. The second, third and fourth wall portions 21, 22, 23 taper outwardly from a lower end to an upper end to facilitate nesting of the tank members 11, 12 during transport and storage.

A reinforced flange 24 extends around the upper end of the second, third and fourth wall portions 21, 22, 23 of each of the first and second lower tank members 11, 12. The flange 24 has a flat top surface 25 adapted to provide a seal between the lower tank members 11, 12 and the cover member 13.

A plurality of flat areas 26–29 with raised thicknesses are provided on the side walls 16 of the lower tank members 11, 12. The flat areas 26–29 each have an outer surface that extends in a respective vertical plane. The flat areas 26–29 are adapted to receive couplers for connecting a plurality of the tank structures 10 together, as described below. First and second flat areas 26, 27 are provided near the upper ends of the second and third side wall portions 21, 22, respectively. A third flat area 28 is provided near the upper end of a mid point of the fourth side wall portion 23, and a fourth flat area 29 is provided near the lower end of the fourth side wall portion 23. The flat areas 26–29 each define a generally square-shaped mounting area that has a greater wall thickness than the adjacent portions of the respective side walls 16. The wall thickness of the flat mounting areas 26–29 increases from top to bottom to correspond with the tapering side walls 16. Alternatively, the wall thickness of the flat mounting areas 26–29 can be made the same from top to bottom with both the inner and outer surfaces extending in vertical planes. The outer surfaces of the first and second flat areas 26, 27 extend in respective vertical planes that are generally parallel to each other, while the outer surfaces of the third and fourth flat areas 28, 29 extend in respective vertical planes that are generally perpendicular to the vertical planes containing the first and second flat areas 26, 27.

The first and second flat areas 26, 27 are preferably formed with foam inserts 30 positioned between two layers 31, 32 of molded material. The foam inserts 30 between the layers 31, 32 of molded material facilitate connections with high impact resistance between adjacent tank structures 10 using conventional bulkhead couplers.

The cover member 13 has a lower periphery 33, a manhole opening 34, and a steeply sloped wall portion 35 extending between the lower periphery 33 and the manhole opening 34. The sloped wall portion 35 can be reinforced with structural composites and/or ribbing as needed to provide added strength to support the weight of overburden.

The lower periphery 33 of the cover member 13 has an oval shape that corresponds to the oval shape defined by outer peripheries of the upper ends 15 of the assembled tank members 11, 12. A channel-shaped configuration 36 is provided on the lower periphery 33 of the cover member 13 to receive the flange 24 on the upper end 15 of the lower tank members 11, 12. The channel-shaped configuration 36 has inner and outer vertical edges 37, 38 and a horizontal portion 39 extending between the inner and outer vertical edges 37, 38. The outer vertical edge 38 is interrupted in regions corresponding with the first and second flat mounting areas 26, 27 formed near the upper ends of the first and second tank members 11, 12. Thus, the outer vertical edge 38 does not interfere with a tight connection between two adjacent tank structures 10. The channel-shaped configuration 36 enhances the seal between the cover member 13 and the tank members 11, 12, and also helps retain the shape of the lower tank members 11, 12.

A sealant, such as an adhesive foam gasket, can be applied to the flange 24 to provide a positive seal between the flange 24 and the cover member 13. The steeply sloped wall portion 35 is angled to resist the compressive weight of overburden, which acts to further enhance the seal at the flange 24. The seal at the flange 24 is generally above the liquid waste contained within the lower tanks 11, 12. The compression seals in the bulkhead couplers provide reliable seals below the liquid level wherever they are needed.

Septic waste treatment systems using a plurality of the septic tank structures 10 of the present invention will now be described.

Figure 1:
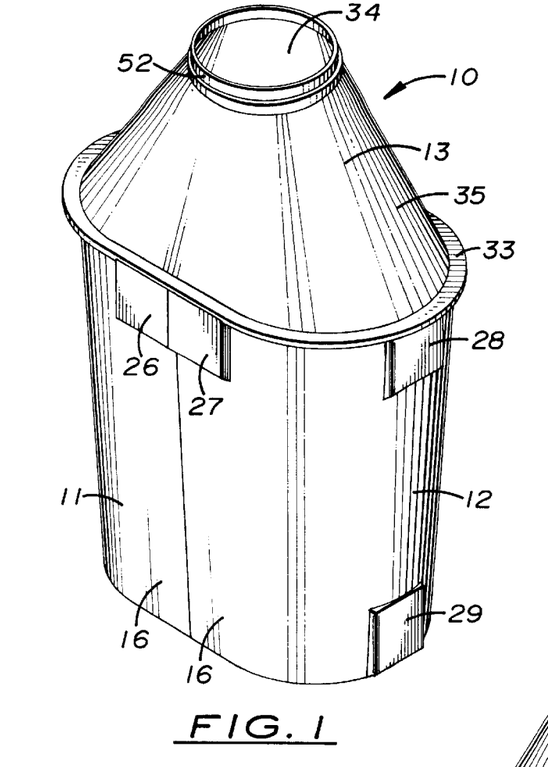
FIG. 1 is a perspective view of a septic tank structure according to the present invention.
Figure 2:
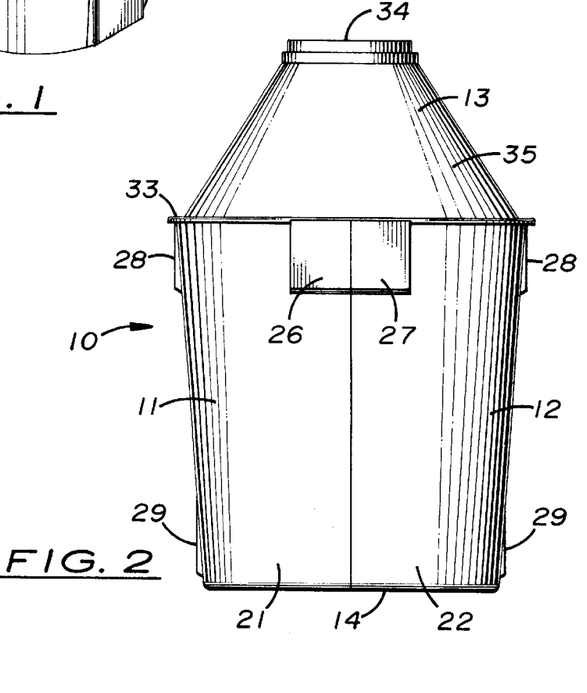
FIG. 2 is a side view of the septic tank structure according to the present invention.
Figure 3:
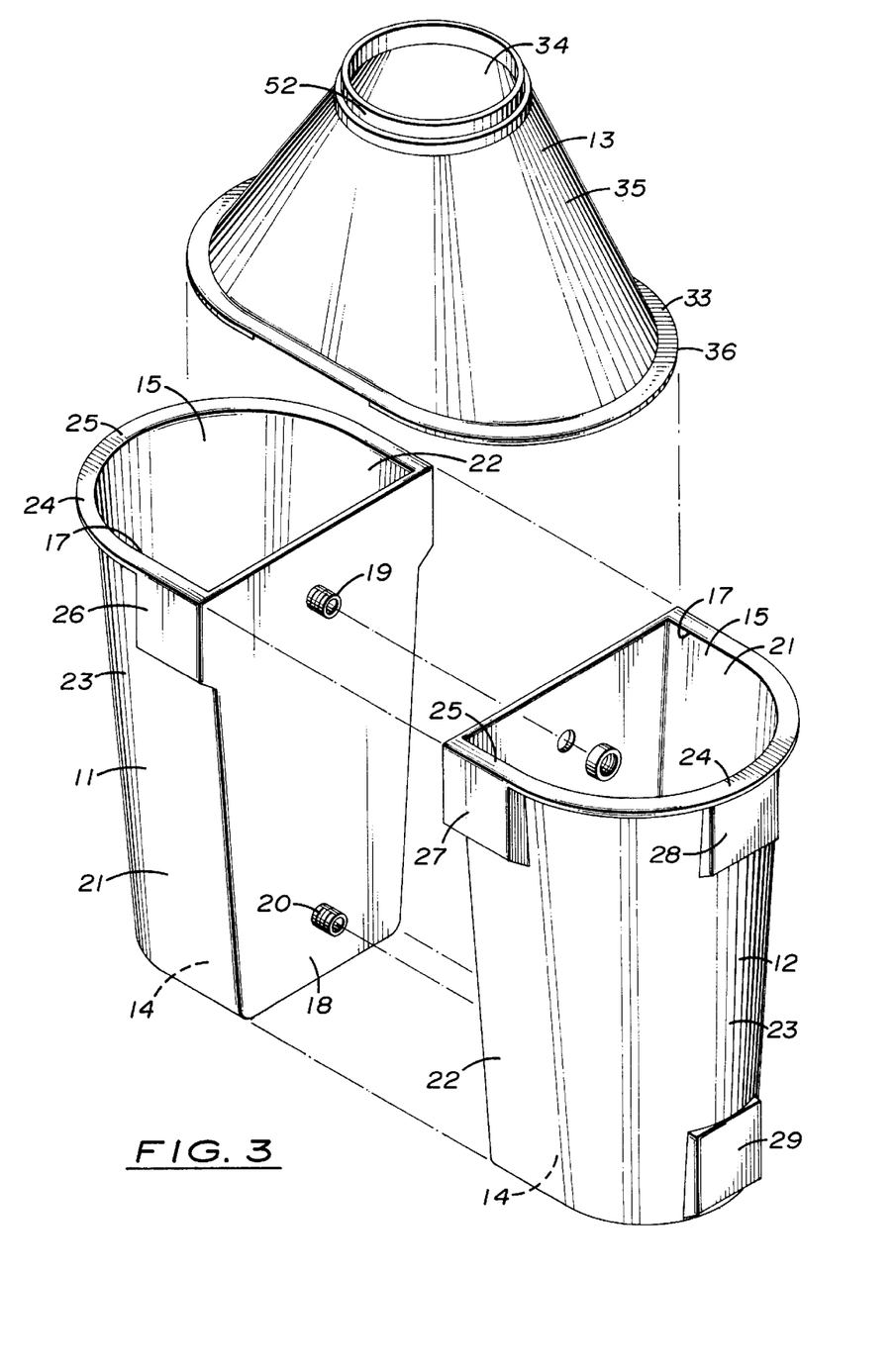
FIG. 3 is an exploded perspective view of the septic tank structure according to the present invention.
Figure 4:
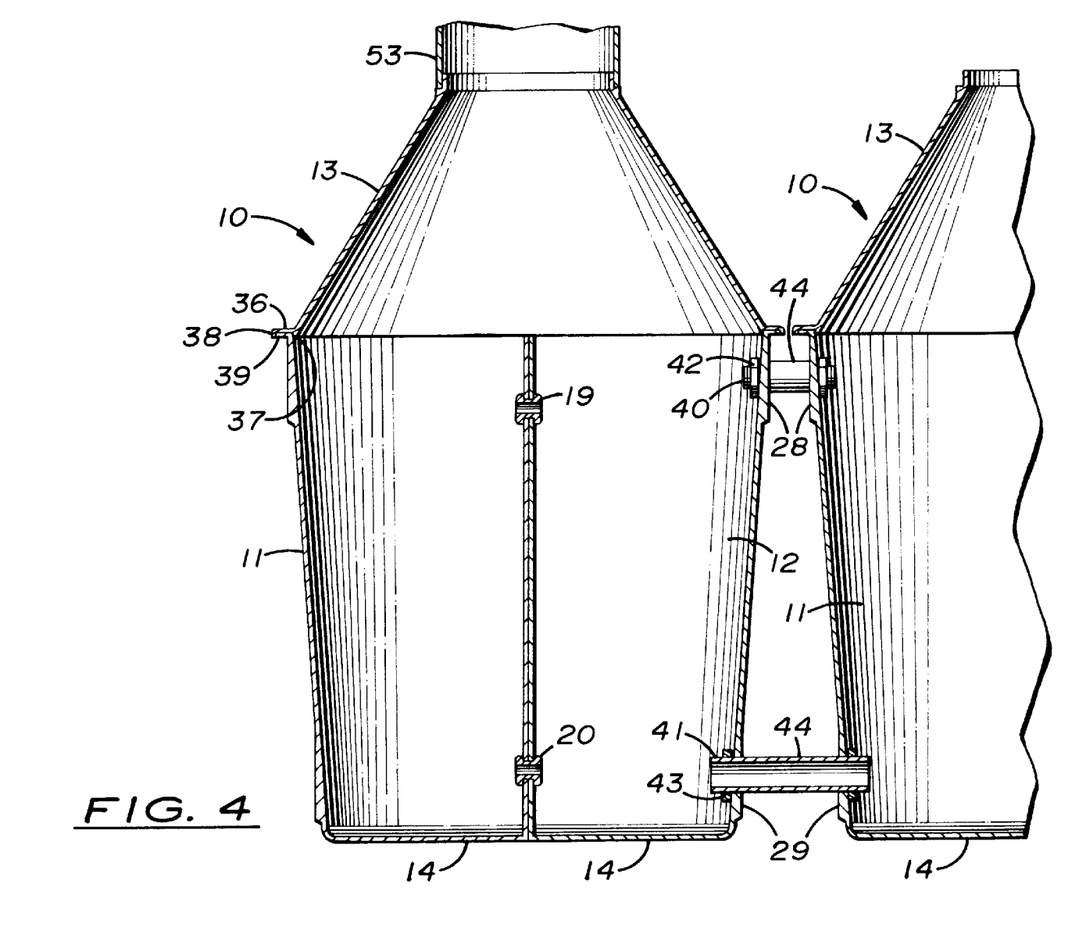
FIG. 4 is a cross-sectional side view of two septic tank structures connected together at their respective ends.

As shown in FIG. 4, two septic tank structures 10 can be connected together end-to-end by a first connection 40 between the respective third flat areas 28, and a second connection 41 between the respective fourth flat areas 29. The connections 40, 41 are provided by boring holes through the respective flat areas 28, 29 and extending standard bulkhead couplers 42, 43 through the holes. A short length of pipe 44 can be used with the couplers 42, 43, particularly between the fourth flat areas 29 at the bottom of the tank members 11, 12, to complete the connection. The couplers 42, 43 function to secure the septic tank structures 10 together and keep them in proper relationship to each other, and also to provide fluid communication between the tank structures 10.

Figure 5:
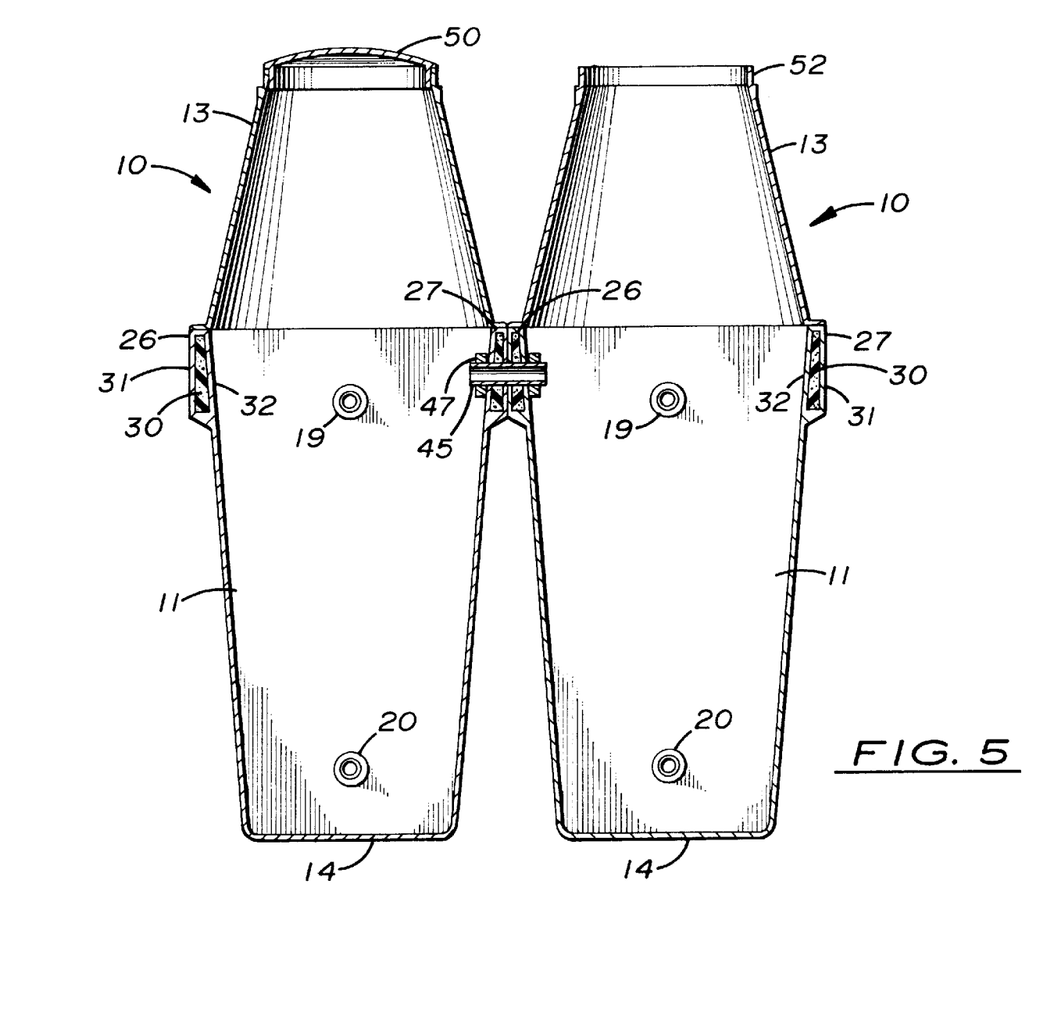
FIG. 5 is a cross-sectional end view of two septic tank structures connected together at their respective sides.

As shown in FIG. 5, two septic tank structures 10 can also be connected together side-by-side by a connection 45 between the adjacent first and second flat areas 26, 27. The connection 45 is provided by boring holes through the flat areas 26, 27 and extending standard bulkhead couplers 47 through the holes 46. In this case, the first and second flat areas 26, 27 of the connected tank structures 10 are clamped together by the bulkhead couplers 47 and a short length of pipe is not used. The foam inserts 30 enhance the seal and increase the shock absorbing capacity of the connection 45, thereby making the system more durable. As with the arrangement shown in FIG. 4, the couplers 47 function to secure the septic tank structures 10 together and also to provide fluid communication between the tank structures 10.

Figure 6:
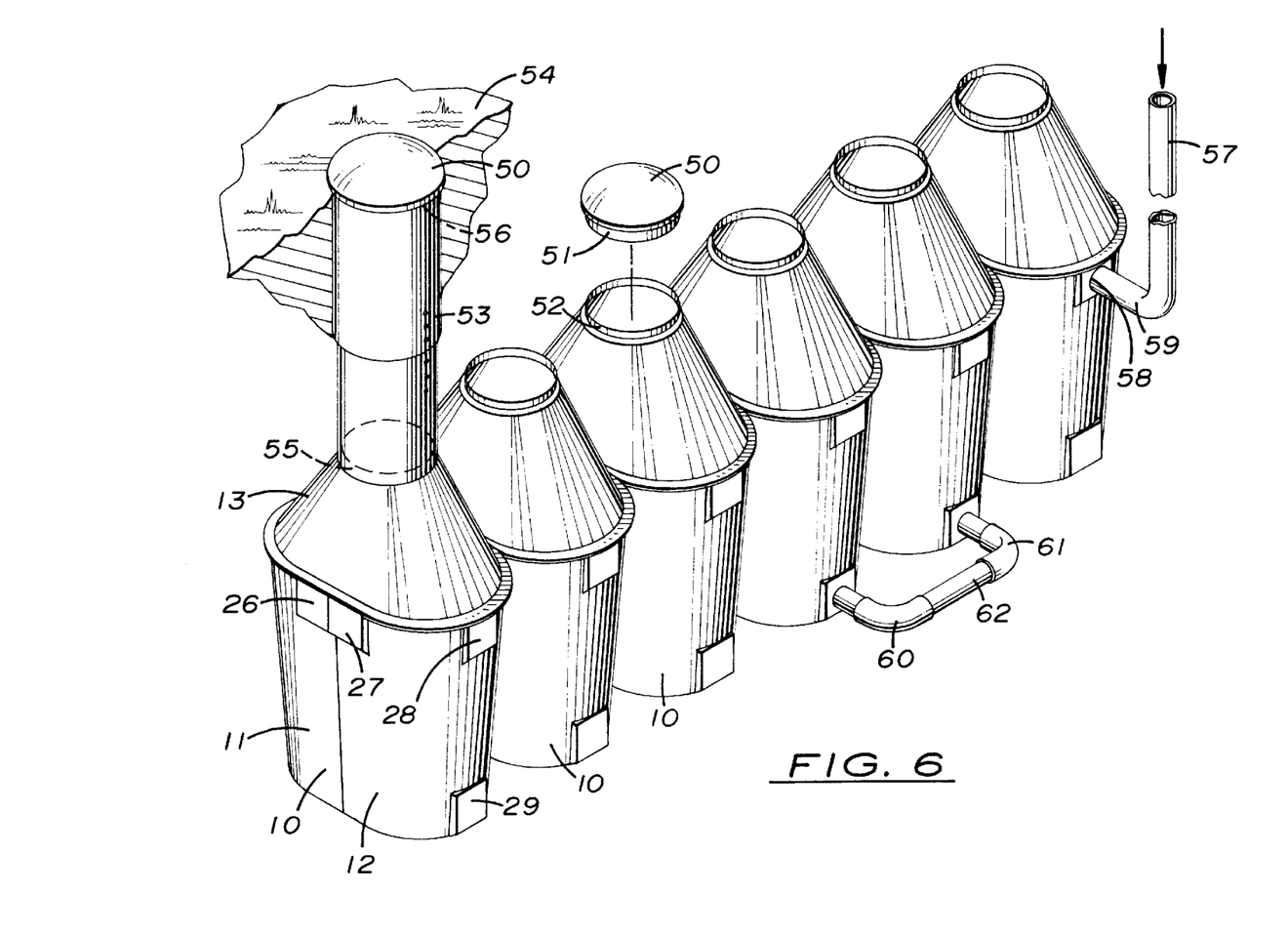
FIG. 6 is a perspective view of plurality of septic tank structures connected together in a linear arrangement to form a multi-tank waste treatment system.

As shown in FIG. 6, the connected tank structures 10 can be arranged in a linear array and connected together by connections 45 similar to those shown in FIG. 5. Depending on the particular application, one or two bulkhead couplers 47 can be used to secure each pair of tank structures 10 together.

Figure 7:
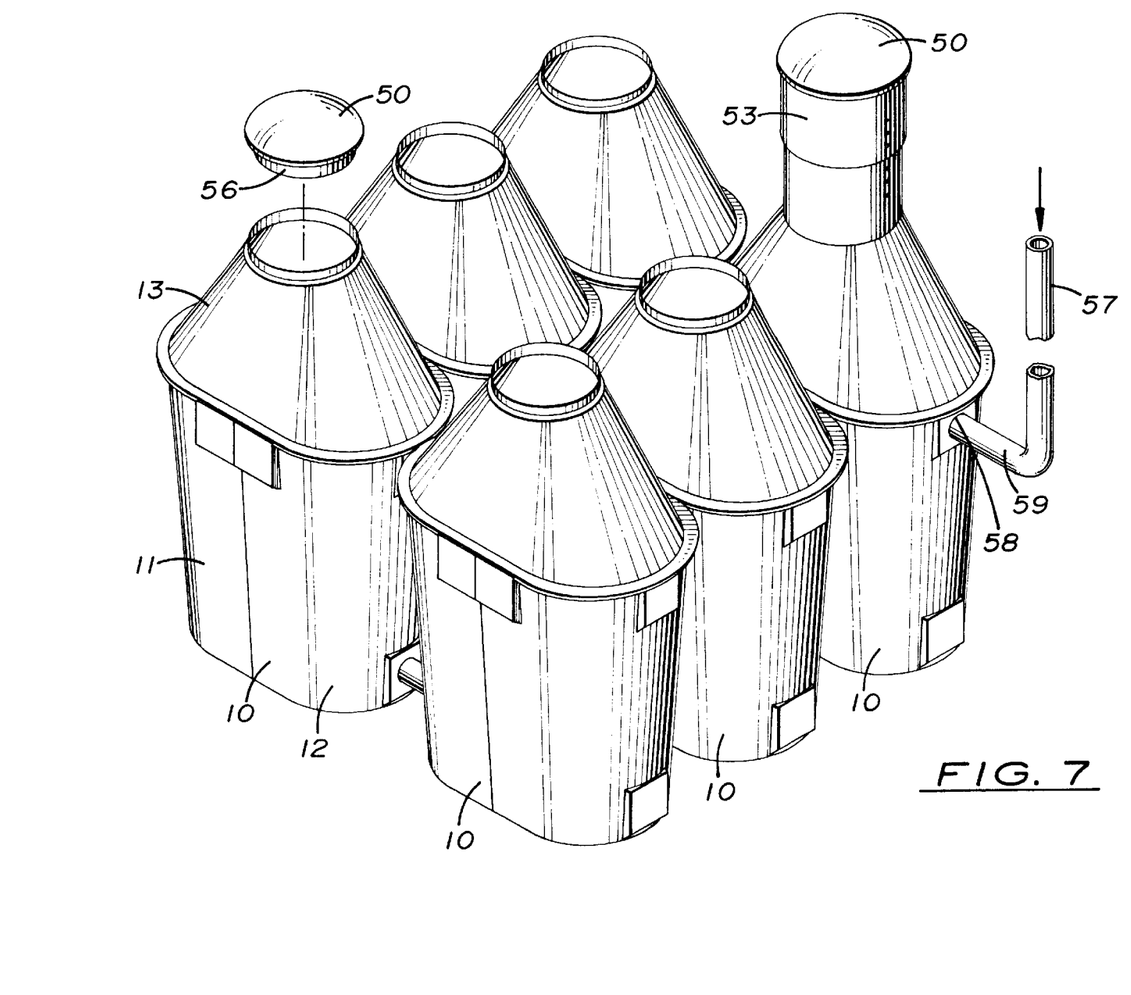
FIG. 7 is a perspective view of a plurality of septic tank structures connected together in a stacked arrangement to form a multi-tank waste treatment system.

As shown in FIG. 7, the connected tank structures 10 can be arranged in a two-dimensional array and connected together by connections 40, 41, 45 similar to those shown in FIGS. 4 and 5. Again depending on the particular application, one or two bulkhead couplers 42, 43, 47 can be used to secure each pair of tank structures 10 together.

The manhole openings 34 at the top of the assembled tank structures 10 provide convenient access to both of the lower tank members 11, 12 of each assembled structure 10. For example, if it is necessary to remove sewage from the septic waste treatment system, both lower tank members 11, 12 can be accessed from the single manhole opening 34. The manways provided by the manhole openings 34 arise naturally and inexpensively from the design and do not reduce the strength of the tank structure 10.

A sealing lid 50 is provided to fit over the manhole opening 34 and seal the assembled tank structure 10. The lid 50 preferably has a sealing lip 51 extending around its lower periphery for contacting with the edge 52 of the manhole opening 34. Alternatively, an adjustable length tube 53 can be used to extend the manhole opening 34 to the ground surface level 54. A lower end 55 of the tube 53 is configured to engage and seal with the edge 52 of the manhole opening 34, while the upper end 56 of the tube 53 is configured to receive the sealing lid 50. The adjustable length tube 53 can be a telescoping arrangement that can be adapted at the work site easily to accommodate systems buried at different depths.

The waste treatment systems can be connected to a sewer line 57 through a bore 58 and coupler 59 provided at one of the flat mounting areas on the lower tank members 11, 12. The lower tank members 11, 12 can also be connected to each other using standard pipe fittings and bores extending through selected flat mounting areas 26–29. For example, adjacent tank structures 10 can be connected at their lower ends using two 90 degree ells 60, 61 and a short length of pipe 62, as shown in FIG. 6. Many other connections can also be made to suit a particular application. For example, the third flat area 28 on one tank structure 10 can be connected to the fourth flat area 29 on an adjacent tank structure 10, or even on a nonadjacent tank structure.

The lower tank members 11, 12 and the cover member 13 are particularly suitable for being fabricated using polydicyclopentadiene thermoset materials. These polymer materials have a high corrosion resistance required by sewage treatment systems, and also a high impact resistance that reduces the risk of shipping and handling damage. These materials can be reinforced with fiberglass to increase the strength of the final product in critical areas, such as the conical top. The shape of the tank structure 10 lends itself to closed molding methods that can control wall thicknesses accurately. For example, the lower end 14 and the flat side wall portion 18 of the lower tank members 11, 12 can have reduced thicknesses relative to the cylindrical side wall portion 23 for maximum economy of construction.

The particular size, volume and dimensions of the septic tank structures 10 of the present invention can be adjusted as needed to suit a particular hole depth, discharge height, sewage flow rate and volume, and so forth. In the preferred embodiment, each receptacle formed by the lower tank members 11, 12 is the same size and has a volume that generally matches each stage of conventional sewage treatment systems, such as the conventional system used by MicroSepTec. Multiple tank sizes can also be used to suit a particular application.

The septic tank structure 10 of the present invention provides a versatile design that can be configured in many different ways with only a few basic components. As a result, many optional sewage treatment systems using the same components can be provided using a small inventory of parts. The basic components 11, 12, 13 are designed to nest together so that each system can be stored and shipped in a very compact package, thereby reducing shipping and storage costs. The individual components are lightweight so that they can be unloaded and assembled on site by manpower and ordinary hand tools without the need for a crane and the like, thereby further reducing costs.

The generally cylindrical sidewall portions 23 of the lower tank members 11, 12 are shaped to resist side pressure, especially during backfilling operations. The lower tank members 11, 12 can be filled to further resist side pressure during backfilling, and then emptied again after the earth has developed sufficient compression to support itself.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A septic tank structure, comprising:

first and second lower tank members, each of said tank members having a closed lower end, an open upper end, and side walls extending between the lower and upper ends to form a receptacle for receiving waste materials; and a cover member having a lower periphery, a manhole opening, and a sloped wall that extends from the lower periphery upwardly and radially inwardly to said manhole opening;

said first and second lower tank members being arranged with respective first portions of said side walls abutting each other, said cover member being positioned over said first and second lower tank members with the lower periphery of said cover member supported on and forming a seal with the respective upper ends of said first and second lower tank members.

2. The septic tank structure according to claim 1, wherein the respective first portions of the side walls comprise first flat wall portions and extend in a substantially vertical plane, and the upper ends of the first and second lower tank members define an outer periphery having a first oval shape when said first and second lower tank members are arranged with said first flat wall portions abutting each other.

3. The septic tank structure according to claim 2, wherein the lower periphery of said cover member has a shape that corresponds to the first oval shape defined by the upper ends of the lower tank members.

4. The septic tank structure according to claim 2, wherein the lower ends of the first and second lower tank members define an outer periphery having a second oval shape when said first and second lower tank members are arranged with their first flat wall portions abutting each other, said second oval shape being smaller than said first oval shape.

5. The septic tank structure according to claim 2, wherein the side walls of each of said first and second tank members comprise second and third flat wall portions that extend generally perpendicular from each side of said first flat wall portion, and a fourth curved wall portion that extends between said second and third flat wall portions, said fourth curved wall portion being generally semi-cylindrical with a slightly smaller diameter at its lower end as compared to its upper end.

6. The septic tank structure according to claim 5, wherein each of said second, third and fourth wall portions tapers outwardly from the lower end to an upper end to facilitate nesting of said tank members during transport and storage.

7. The septic tank structure according to claim 6, wherein upper edges of said first, second, third and fourth wall portions of each of said tank members define one half of an oval shape in plan view.

8. The septic tank structure according to claim 5, wherein at least one of said second and third wall portions have a flat area with a raised thickness near the upper end thereof extending in a vertical plane and adapted to receive a coupler.

9. The septic tank structure according to claim 5, wherein said fourth wall portion has at least one flat area with a raised thickness extending in a vertical plane and adapted to receive a coupler.

10. The septic tank structure according to claim 5, wherein said second, third and fourth wall portions each has a flat area with a raised thickness near the upper end thereof, said fourth wall portion has another flat area with a raised thickness near the lower end thereof, and each of said flat areas extend in a vertical plane and are adapted to receive a coupler.

11. The septic tank structure according to claim 10, wherein said flat areas in said second and third wall portions are formed by two molded layers of material and have a foam insert positioned between the two molded layers.

12. The septic tank structure according to claim 1, wherein the lower periphery of said cover member has a channel-shaped configuration that receives the upper ends of said first and second tank members.

13. The septic tank structure according to claim 12, wherein said channel-shaped configuration comprises inner and outer vertical edges and a horizontal portion extending between said inner and outer vertical edges, said outer vertical edge being interrupted in regions corresponding with flat mounting areas formed in the upper ends of the first and second tank members.

14. The septic tank structure according to claim 12, wherein a flange extends across the upper end of the second, third and fourth wall portions of each of said first and second tank members, said flange having a flat top surface received into said channel-shaped configuration of said cover member to form a seal between the cover member and the flange.

15. The septic tank structure according to claim 1, wherein said first and second tank members are secured together by bulkhead connections extending through openings in the respective first wall portions.

16. A septic waste treatment system having a plurality of septic tank structures according to claim 1 arranged in a linear array and connected together by couplings that provide fluid communication between said tank structures.

17. A septic waste treatment system having a plurality of septic tank structures according to claim 1 arranged in a two-dimensional array and connected together by couplings that provide fluid communication between said tank structures.

18. The septic tank structure according to claim 1, wherein said tank members and said cover member are each formed of a polydicyclopentadiene thermoset material.

19. A septic waste treatment system, comprising:
a plurality of septic tank structures connected together for fluid communication therebetween, each of said septic tank structures comprising:
first and second lower tank members, each of said tank members having a closed lower end, an open upper end, and side walls extending between the lower and upper ends to form a receptacle for receiving waste materials; and
a cover member having a lower periphery, a manhole opening, and a sloped wall that extends from the lower periphery upwardly and radially inwardly to said manhole opening;
said first and second lower tank members being arranged with respective first portions of said side walls abutting each other, said cover member being positioned over said first and second lower tank members with the lower periphery of said cover member supported on and forming a seal with the respective upper ends of said first and second lower tank members.

20. A septic tank structure, comprising:
first and second lower tank members, each of said tank members having a closed lower end, an open upper end, and side walls extending between the lower and upper ends to form a receptacle for receiving waste materials; and
a cover member having a lower periphery, a manhole opening, and a steeply sloped wall that extends from the lower periphery upwardly and radially inwardly to said manhole opening, said manhole opening being substantially smaller than said lower periphery of said cover member;
said first and second lower tank members each having a flat side wall portion, the upper end of each tank member defining a respective half of an oval shape in plan view, the lower periphery of said cover member having an oval shape adapted to be supported on and form a seal with the respective upper ends of the first and second lower tank members upon being assembled together.

* * * * *